United States Patent
Jenkins

(10) Patent No.: US 11,993,212 B1
(45) Date of Patent: May 28, 2024

(54) PORTABLE TOILET SYSTEM

(71) Applicant: Flow-N-Go Company LLC, Tonganoxie, KS (US)

(72) Inventor: Shana Kaye Jenkins, Tonganoxie, KS (US)

(73) Assignee: Flow-N-Go Company LLC, Tonganoxie, KS (US)

( * ) Notice: Subject to any disclaimer, the term of this patent is extended or adjusted under 35 U.S.C. 154(b) by 143 days.

(21) Appl. No.: 17/948,395

(22) Filed: Sep. 20, 2022

Related U.S. Application Data

(60) Provisional application No. 63/251,094, filed on Oct. 1, 2021.

(51) Int. Cl.
*B60R 15/04* (2006.01)

(52) U.S. Cl.
CPC .................................... *B60R 15/04* (2013.01)

(58) Field of Classification Search
CPC ...................................................... B60R 15/04
USPC ...................................................... 4/449, 458
See application file for complete search history.

(56) References Cited

U.S. PATENT DOCUMENTS

| | | | | |
|---|---|---|---|---|
| 4,028,746 A | * | 6/1977 | Huck ........................ | E03D 7/00 4/DIG. 13 |
| 5,946,742 A | * | 9/1999 | Parker ..................... | B60R 15/04 4/458 |
| 6,189,944 B1 | * | 2/2001 | Piche ..................... | B60P 3/0257 296/22 |
| 6,651,267 B1 | * | 11/2003 | Utz .......................... | A61G 7/02 4/444 |
| 6,723,173 B1 | * | 4/2004 | Golladay ............... | A47K 11/00 4/321 |
| 10,302,320 B2 | * | 5/2019 | Howard ................ | F24F 13/222 |
| 11,748,769 B1 | * | 9/2023 | Williams .......... | G06Q 10/06315 600/210 |
| 2003/0019031 A1 | * | 1/2003 | Mosis ...................... | E03C 1/18 4/625 |
| 2007/0017015 A1 | * | 1/2007 | Finell ..................... | A47K 11/06 4/483 |
| 2007/0214559 A1 | * | 9/2007 | Al-Mutairi ............. | A47K 11/04 4/476 |

(Continued)

FOREIGN PATENT DOCUMENTS

| | | | | |
|---|---|---|---|---|
| AU | 2005101059 A4 | * | 2/2006 | ............. A47K 11/06 |
| BR | 202013030292 U2 | * | 1/2016 | ............... E03D 9/10 |

(Continued)

*Primary Examiner* — Lori L Baker
(74) *Attorney, Agent, or Firm* — Fresh IP PLC; John R. Bednarz

(57) ABSTRACT

A system includes a first portion comprising: a bowl to receive liquid body waste and a receptacle to receive a tube, a base having at least one anti-slip surface on a bottom of the base, a leveling device incorporated into the base and configured to allow the bowl to be angled at an angle of zero to fifteen degrees, the leveling device having at least one rod in a leveling rod slot of the base, each rod having a corresponding pin and a first handle on a right side of the bowl and a second handle on a left side of the bowl, and a second portion comprising: a hose that connects from the tube on a first end to a container on a second end to transport the liquid body waste from the bowl to the container, the container storing the liquid body waste.

20 Claims, 15 Drawing Sheets

(56) References Cited

U.S. PATENT DOCUMENTS

| | | | | |
|---|---|---|---|---|
| 2010/0050333 | A1* | 3/2010 | Jenkins | A47K 11/04 4/483 |
| 2012/0084907 | A1* | 4/2012 | Dunn | A47K 11/06 4/242.1 |
| 2012/0167297 | A1* | 7/2012 | Poust | E04H 1/1205 4/321 |
| 2014/0215702 | A1* | 8/2014 | Ito | E03D 7/00 4/321 |
| 2015/0021963 | A1* | 1/2015 | Reed | B62B 9/00 4/483 |
| 2019/0136497 | A1* | 5/2019 | Steigerwald | E03D 5/016 |
| 2019/0308545 | A1* | 10/2019 | Tagvoian | B60R 15/02 |
| 2021/0146776 | A1* | 5/2021 | Bollinger | H01M 10/425 |

FOREIGN PATENT DOCUMENTS

| | | | | | |
|---|---|---|---|---|---|
| BR | 202017018773 | U2 | * | 3/2019 | A47K 11/06 |
| CN | 203974653 | U | * | 12/2014 | A47K 11/06 |
| CN | 106963276 | A | * | 7/2017 | B60R 15/04 |
| DE | 102007016819 | A1 | * | 10/2008 | B60R 15/04 |
| EP | 1837242 | A1 | * | 9/2007 | B60P 3/2245 |
| EP | 1873120 | A1 | * | 1/2008 | B60R 15/04 |
| WO | WO-9606235 | A1 | * | 2/1996 | E03D 5/01 |
| WO | WO-2007011793 | A2 | * | 1/2007 | A47K 11/06 |
| WO | WO-2009138784 | A2 | * | 11/2009 | A47K 11/06 |
| WO | WO-2012146767 | A1 | * | 11/2012 | B60R 15/04 |
| WO | WO-2016149782 | A1 | * | 9/2016 | A47K 11/00 |
| WO | WO-2022255192 | A1 | * | 12/2022 | B60R 15/04 |
| WO | WO-2023214108 | A1 | * | 11/2023 | A47K 11/06 |

* cited by examiner

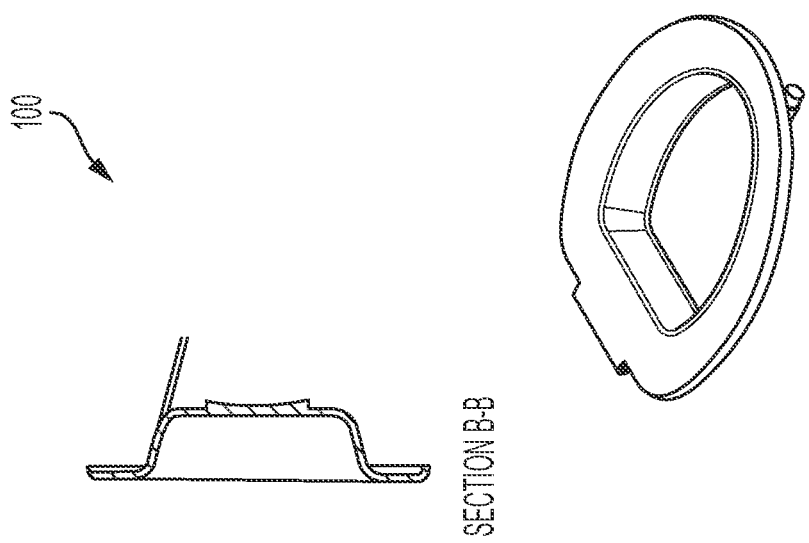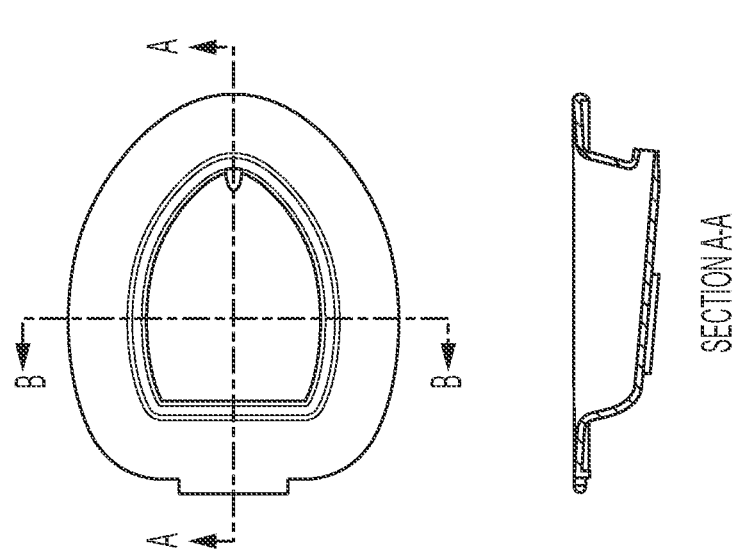
FIG. 2A

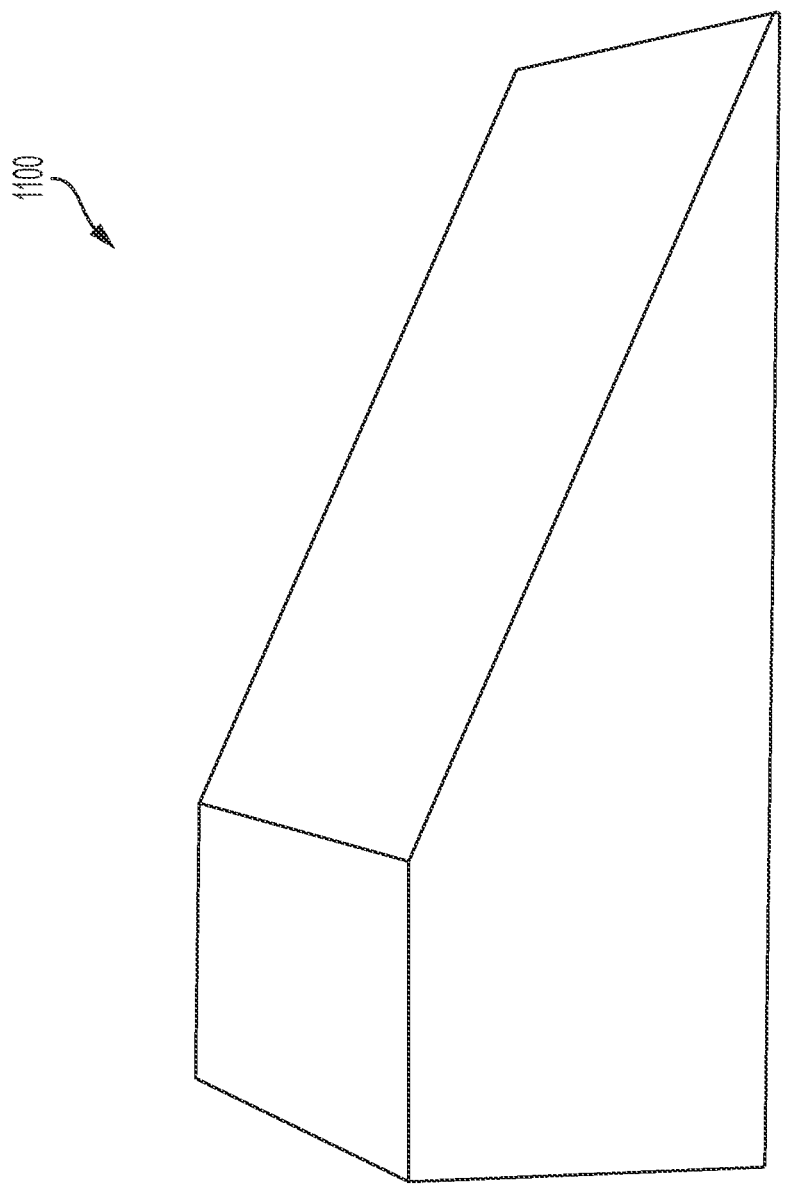

PORTABLE TOILET SYSTEM

CROSS-REFERENCE TO RELATED APPLICATION

This application claims the benefit of U.S. Provisional Application No. 63/251,094 filed Oct. 1, 2021, entitled "Vehicle Portable Toilet System," the entire contents of which are incorporated herein by reference.

BACKGROUND

In many instances, it can be difficult to locate a restroom or bathroom. As an example, most vehicles do not have restrooms or bathrooms. When traveling a long distance or when located in a rural area, there simply may not be a restroom or bathroom available. Additionally, there are many locations and situations where there are no restrooms or bathrooms. Even if a restroom or bathroom is available, it may be dirty or inaccessible for a number of reasons.

It is with these issues in mind, among others, that various aspects of the disclosure were conceived.

SUMMARY

The present disclosure is directed to a portable toilet system. The portable toilet system may include a first portion and a second portion. The first portion may include one or more components that may be placed or held on a seat in a vehicle. The second portion may include one or more components that may be placed or held on a floorboard of the vehicle. The first portion may include a bottom base, a side base, an enclosure, and a bowl. The second portion may include a tube, a hose, and a container to store liquid body waste. The first portion may be detached from the second portion and the second portion, particularly the container, may be removed from the vehicle for disposal of the liquid body waste.

In one example, a system may include a first portion comprising a bowl to receive liquid body waste and a receptacle to receive a tube, a base having at least one anti-slip surface on a bottom of the base, a leveling device incorporated into the base and configured to allow the bowl to be angled at an angle of zero to fifteen degrees, the leveling device having at least one rod in a leveling rod slot of the base, each rod having a corresponding pin and a first handle on a right side of the bowl and a second handle on a left side of the bowl, and a second portion comprising a hose that connects from the tube on a first end to a container on a second end to transport the liquid body waste from the bowl to the container, the container storing the liquid body waste.

In another example, a system may include a first portion comprising a bowl to receive liquid body waste and a receptacle to receive a tube, a base having at least one anti-slip surface on a bottom of the base, a leveling device comprising a foam block and configured to allow the bowl to be angled at an angle of zero to fifteen degrees, and a second portion comprising: a hose that connects from the tube on a first end to a container on a second end to transport the liquid body waste from the bowl to the container, the container storing the liquid body waste.

In another example, a method may include placing a base of a portable toilet system on a seat of a vehicle, placing a container of the portable toilet system on a floorboard of the vehicle, adjusting an angle of a bowl of the portable toilet system using a leveling device incorporated into the base and configured to allow the bowl to be angled at the angle of zero to fifteen degrees, the leveling device having at least one rod, each rod having a corresponding pin and a first handle on a right side of the bowl and a second handle on a left side of the bowl, receiving liquid body waste in the bowl of the portable toilet system while in the vehicle and delivering the liquid body waste from the bowl of the portable toilet system to a container of the portable toilet system using a hose that is connected from the bowl of the portable toilet system to the container, and emptying the container of the portable toilet system.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 2A is a diagram of a bowl of a portable toilet system according to an example of the instant disclosure.

FIG. 11 is a diagram of a wedge block for leveling the portable toilet system according to an example of the instant disclosure.

DETAILED DESCRIPTION

Figure 1:
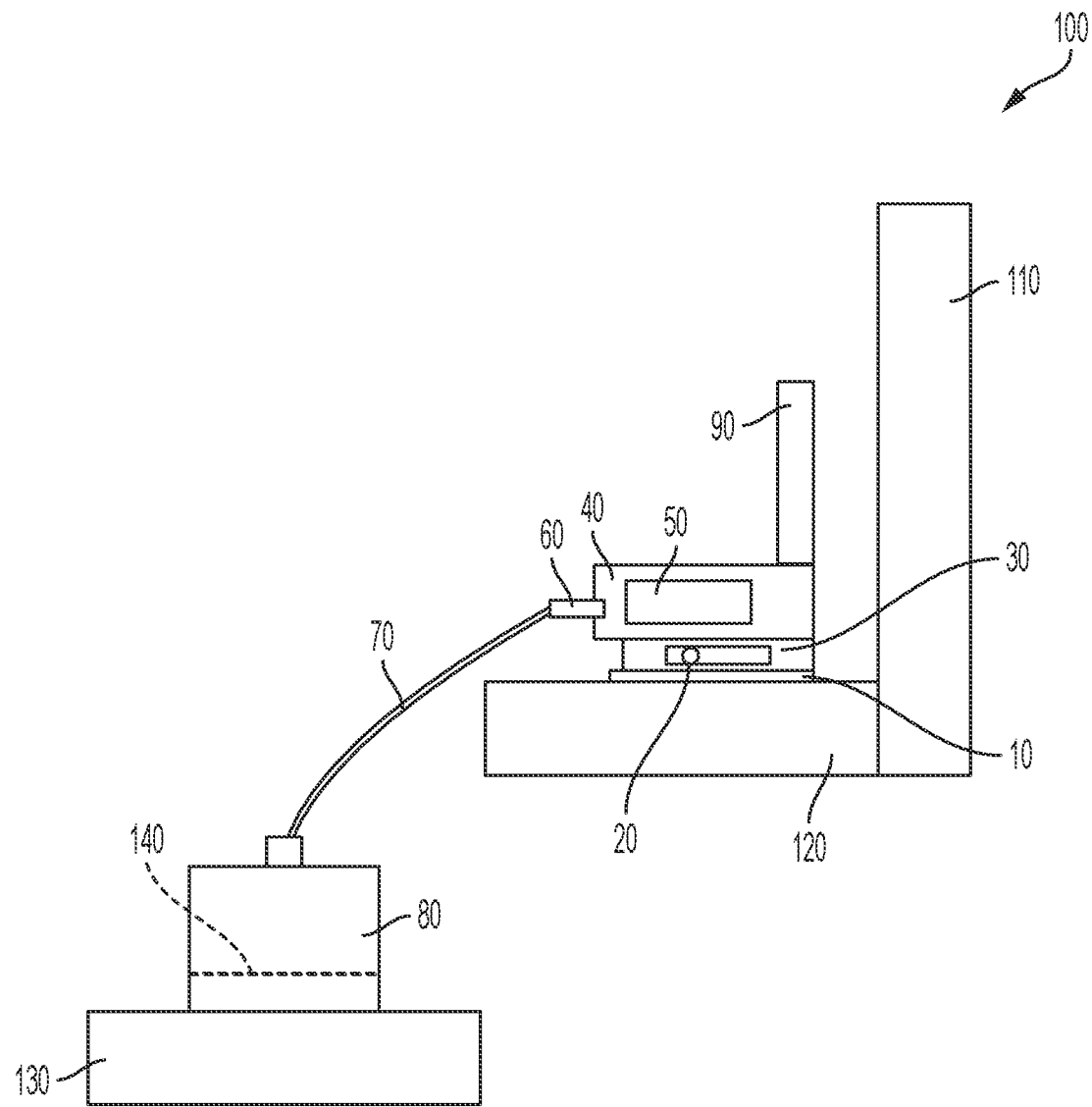
FIG. 1 is a block diagram of a portable toilet system according to an example of the instant disclosure.

The present disclosure is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present disclosure, as the disclosure encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

Conditional language, such as, among others, "can." "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

A portable toilet system may include a first portion and a second portion. The first portion may include a bowl to receive liquid body waste and a receptacle to receive a tube, a base having at least one anti-slip surface on a bottom of the base, a leveling device incorporated into the base and configured to allow the bowl to be angled at an angle of zero to fifteen degrees, the leveling device having at least one rod in a leveling rod slot of the base, each rod having a corresponding pin and a first handle on a right side of the bowl and a second handle on a left side of the bowl. The second portion may include a hose that connects from the tube on a first end to a container on a second end to transport the liquid body waste from the bowl to the container, the container storing the liquid body waste.

The container may be one of a one gallon opaque container and a collapsible one gallon bladder. Additionally, the container may have a handle, a neck, a cap to open and close the container, and a lanyard attached to the cap. The container can be portable and removable from the system.

As an example, the hose may include at least one connector and can be six inches in length. The hose can connect with the tube using a garden hose thread (GHT). Additionally, the hose can connect with the container using a GHT.

In one example, the first portion is seated on a seat of the vehicle and the second portion is seated on a floorboard of the vehicle.

In another example, the base may include a bottom base and a side base, the bottom base is plastic and can have ridges associated with the leveling device and a tube hole to receive the tube. The side base can be plastic and attach to the bottom base and have an enclosure for the bowl and a flared bottom providing stability.

In another example, the at least one anti-slip surface may be a silicone rubber surface on a first side of the anti-slip surface and a self-adhesive on a second and opposite side of the anti-slip surface.

In another example, the leveling device may include a foam block and be configured to allow the bowl to be angled at an angle of zero to fifteen degrees. The foam block may be 9.3 inches long, 3.0 inches tall, and 6.0 inches wide, and have a 2.5 inch top section transitioning lengthwise from 3.0 inches tall from a top of the foam block at a first end of the foam block to zero inches at a bottom of the foam block at a second end of the foam block.

Additionally, a method may include placing a base of a portable toilet system on a seat of a vehicle, placing a container of the portable toilet system on a floorboard of the vehicle, adjusting an angle of a bowl of the portable toilet system using a leveling device incorporated into the base and configured to allow the bowl to be angled at the angle of zero to fifteen degrees, the leveling device having at least one rod, each rod having a corresponding pin and a first handle on a right side of the bowl and a second handle on a left side of the bowl, receiving liquid body waste in the bowl of the portable toilet system while in the vehicle and delivering the liquid body waste from the bowl of the portable toilet system to a container of the portable toilet system using a hose that is connected from the bowl of the portable toilet system to the container, and emptying the container of the portable toilet system.

In one example, the portable toilet system may be used and/or included in a vehicle such as an automobile or car. The portable toilet system may provide a user with a multiuse, odor free restroom in the comfort and privacy of the automobile. The portable toilet system may be placed and fit in a seat of the car. In one example, the portable toilet system may include a bottom surface that may be an anti-slip surface to prevent movement of the portable toilet system. The portable toilet system may include a leveling system or device that may allow for the portable toilet system to be used at various angles. In one example, the leveling system may adjust an angle of the portable toilet system such that the angle is zero degrees. This may allow the portable toilet system to be used on a flat surface. The portable toilet system may include one or more hoses to allow liquid body waste to travel from the tube to a container to store the liquid body waste. In one example, the container may be stored on a floorboard of the vehicle and may temporarily store the liquid body waste until it has to be emptied.

The portable toilet system may allow liquid body waste to flow from a bowl to a separate container on the floorboard of the vehicle. The container may temporarily store the liquid body waste until it can be disposed of in an appropriate location such as a toilet having access to a plumbing system and/or a septic tank, among others. In one example, the container may be opaque and, in another example, the container may be expandable such as a bladder to conserve space.

The portable toilet system provides a convenient, private, sanitary option that allows a person to relieve themselves when nature calls. A user need not locate a bathroom or restroom when traveling or there are none available. The portable toilet system can be used in a vehicle when traveling a long distance or when traveling in a rural area. As another example, the portable toilet system can be used by children in locations that do not provide bathrooms or restrooms such as parks or sports practices/games without available bathrooms. In addition, the portable toilet system can be used by on-the-road truckers and delivery drivers. The portable toilet system can be outfitted at construction sites, campsites that do not have restrooms or bathrooms, watercraft that do not have restrooms or bathrooms, or aircraft that do not have restrooms or bathrooms. Additionally, the portable toilet system can provide a solution when hiking, fishing, hunting, tailgating, and when there are emergencies or medical issues. Alternatively, the portable toilet system can be used by those with lower or limited mobility that may have difficulty using a restroom when traveling or even exiting the vehicle.

The portable toilet system can be located and sized for use in a vehicle, but can be used in other locations. The portable toilet system can sit or rest on a seat in a vehicle and may have a leveling system or device to allow a toilet of the portable toilet system to be level by varying an angle of the portable toilet system up to fifteen degrees. The portable toilet system can have an anti-slip surface on a bottom of the portable toilet system to prevent the portable toilet system from moving, particularly if located in a moving vehicle or on a seat with a slick surface such as leather. The portable toilet system can be flushed or may not have a flush system.

A bowl of the portable toilet system may be angled and/or shaped to allow liquid body waste to travel from a tube through a hose and into a container. The container may rest against a bottom of a seat of the vehicle and may be located on a floorboard of the vehicle allowing for ample leg room or storage room. By locating the container on the floorboard, the portable toilet system has a minimal height. In one example, a top portion of the portable toilet system may be approximately five and a half inches tall, allowing an individual to use the portable toilet system while seated in the vehicle. This may allow enough headroom for the user. By having a second portion associated with the container on the floorboard, this keeps the liquid body waste out of the bowl of the portable toilet system. In addition, this keeps the first portion stable and prevents the liquid body waste from spilling. When a lid of the portable toilet system is in a closed position, this can keep the portable toilet system odor free and keep an associated vehicle odor free. Additionally, the portable toilet system may utilize odor tablets to further prevent odor. The bowl can be cleaned and/or rinsed with a disinfectant to clean the portable toilet system and neutralize odor.

In one example, the portable toilet system can be used many times as needed until the container is full or at capacity. As an example, the container may store approximately one gallon of liquid body waste. The container or second portion may be disconnected or removed from the portable toilet system and the liquid body waste may be disposed of or discarded. The container may be detached from the hose and a cap may be used to seal the container to prevent leakage or spilling. Additionally, the container may be opaque allowing the container to be transported or carried anywhere and the liquid body waste may be discarded in an appropriate location such as a toilet connected to a plumbing system or septic tank. The container also may be cleaned after use.

As an example, the base of the portable toilet system may provide stability for the portable toilet system and may house or include ridges for the leveling system. Additionally, the base may have a tube receptacle to receive and house the tube. The leveling system may be adjusted by pulling or applying a pressure outward on a handle, thereby releasing a pin to allow the leveling rod to move. The leveling system may further include a flared bottom to provide stability. The portable toilet system may have an enclosure that is connected to the leveling system on a bottom, the receptacle for the tube, and may include a bowl to receive the liquid body waste. The bowl may be a toilet bowl and be angled to allow liquid to flow through the receptacle from the tube to the hose.

The tube may have a ¾ inch garden hose thread (GHT) on one end as well as a ¾ GHT hose cap to be closed to prevent leakage and dripping when the container is detached. The hose may be six inches in length including the connector on each side and may be rubber. Alternatively, the hose could be longer or shorter. The hose may have a GHT thread connector on one end and a thirty-eight millimeter adapter that can be connected to the container on the other end. The container may collect the liquid body waste and temporarily store up to one gallon. As an example, the container may have a thirty-eight mm neck as well as a thirty-eight mm cap having a lanyard to prevent the container from leaking or spilling. The container may have a handle and can be opaque with a scale line to provide information associated with a fill level. By being opaque, the container may be discreetly brought from one location, e.g., the vehicle, to another for disposal of the liquid body waste. As an example the portable toilet system may include one or more plastic components or parts that may be injection molded as well as one or more plastic components or parts that may be blow molded.

FIG. 1 is a block diagram of a portable toilet system 100 according to an example of the instant disclosure. In one example, the portable toilet system 100 may include a bottom base 10, a leveling system or device 20, a side base 30, an enclosure 40 having a bowl 50, a tube 60, a hose 70, a container 80, and a lid 90, among other components. The bottom base 10, the leveling system or device 20, the side base 30, the enclosure 40 having the bowl 50, and the lid 90 may be associated with a first portion. The tube 60, the hose 70, and the container 80 may be associated with a second portion.

As shown in FIG. 1, the portable toilet system 100 may include a first or bottom base 10 that may have ridges or connectors that attach or receive a leveling system or device 20. The bottom base 10 may stabilize the portable toilet system 100. In addition, the bottom base 10 may have an anti-slip surface on at least a bottom of the bottom base 10 that may be used to keep the toilet system 100 in place and prevent the toilet system 100 from moving or sliding. The bottom base 10 may be constructed of plastic and may be injection molded. The bottom base may have ridges 11 that are associated with the leveling system 20. In addition, the bottom base 10 may have a tube hole or receptacle 12 to receive a tube as well as the anti-slip surface 13. The anti-slip surface 13 may be silicone rubber on one side and may have self-adhesive on another side. The anti-slip surface may be located or placed on the bottom base 10 to prevent movement of the portable toilet system 100.

The portable toilet system 100 may include the leveling system 20 that may allow the toilet system 100 to be angled from zero degrees up to and including fifteen degrees. This may allow the toilet system 100 to be placed in an automobile and located in a seat of the automobile or a vehicle. Most automobile seats are angled from five to ten degrees greater or less than ninety degrees. The leveling system 20 may include one or more rods 22 having one or more pins 21. Handles 24 attached to each pin 21 can be pulled or adjusted by a user. There may be one or more handles 24 on each side of the toilet system 100 such as a first handle on a left side of the toilet system and a second handle on a right side of the portable toilet system 100. The handles 24 may allow a user to adjust a level of a bowl 50 of the toilet system 100. A user can pull one of the rods 22 using the handle 24 that may be attached to the pin 21. The bottom base 10 of the toilet system may include ridges 23 that can hold the toilet system 100 in place and provide the angle that is adjustable. The leveling system or device 20 can be used to adjust the angle of the toilet system 100 to fit snugly in the seat of the vehicle including a back of the seat 110 and a bottom of the seat 120.

The leveling system 20 allows an angle of the portable toilet system 100 to appropriately drain liquid body waste 140 to a container 80. The liquid body waste may include urine and feces, among others. The leveling system 20 further allows use on surfaces other than vehicle seats having different angles such as flat surfaces. In one example, the leveling system 20 may have the one or more rods 22 with one or more pins 21. There may one or more springs between each rod 22 and each pin 21 that can be compressed to allow the user to pull or push a level and angle of the bowl 50. The bottom base 10 may have the ridges 23 that may receive the leveling system 20 and set a particular angle of the toilet system 100.

The portable toilet system 100 may include a side base 30 or second base that can be connected or attached to the bottom base 10 or first base. The side base 30 may have a flared bottom surface that may provide additional stability and may have rod receptacles or slots to receive the one or more rods 22 associated with the leveling system 20. The side base 30 may be plastic and may be injection molded. The side base 30 may include the flared bottom 31 to provide the additional stability. In addition, the side base 30 may have leveling rod slots 32 for the rod 22 and allow the rod to slide back and forth. The side base 30 may attach to the bottom base 10 as well as an enclosure 40 of the toilet system 100. The enclosure 40 may house the bowl 50 of the portable toilet system 100. Additionally, the enclosure 40 may have one or more receptacles or holes that may allow the tube 60 to pass through. In one example, the enclosure 40 may be plastic and can be injection molded. The enclosure 40 may house a bowl 50 and may have at least one receptacle 41 to allow the tube 60 to pass through.

The portable toilet system 100 may include the bowl 50 that can be angled to receive and allow liquid body waste 140 to flow through a tube, a hose, and into a container for storage. The bowl 50 can be plastic and injection molded. The bowl 50 may be angled 51 to allow the liquid body waste 140 to drain quickly to a drain hole or receptacle 52 that may be in a front of the bowl 50. The angle 51 of the bowl can eliminate splashing of liquids outside of the bowl 50. Additionally, the bowl 50 may have one or more hinges 53 that may attach to a lid of the portable toilet system 100. The bowl 50 may also have a seat in addition to the lid.

The portable toilet system 100 may include a tube 60 that can be curved away from the bowl 50 to the container to allow the liquid body waste 140 to flow from the bowl 50 through a hose 70. The tube 60 can have a ¾ inch garden hose thread (GHT) on one end that can allow the hose 60 to attach to the portable toilet system 100 and prevent leaking. The tube 60 also can have a notch having a hose cap to further prevent leaking or dripping.

The tube 60 can be plastic and may be injection molded. The tube 60 may be angled or curved 61 from the bowl 50 to the container. The angle 61 of the tube may allow the flow of liquid body waste 140 to travel from the bowl 50, through the hose 70, and into the container 80. The tube 60 can connect to the bowl 50 on one end and have a ¾ inch garden hose thread (GHT) 62 on another end to connect with a hose 70. The tube 60 may additionally have a notch for a ¾ inch GHT hose cap 63 to prevent the toilet system 100 from leaking when disconnecting the hose from the tube 60.

The portable toilet system 100 can include a hose 70 that may be six inches long including connectors or another length. The hose 70 may have a ¾ inch GHT on one end and a 38 millimeter (mm) thread connector or another type of connector on another end. The hose 70 connects the portable toilet system 100 to the container allowing the liquid body waste 140 to be contained.

As an example, the hose 70 can be six inches long and it may be a rubber hose or another type of hose. The hose 70 may be a ⅝ inch diameter hose and may have a ¾ inch GHT 72 on the one end of the hose 70 and a 38 mm connector 72 on another end of the hose. The connectors may be different sizes or varieties. The hose 70 can connect to the tube 60 on one side and connect to the container 80 on another side to allow the liquid body waste 140 to drain from the tube 60 to the container 80.

The portable toilet system 100 may have a container 80 that may hold or store one gallon of liquid body waste 140 allowing multiple uses and/or multiple users. In another example, the container 80 may have a different storage capacity. The container 80 may be polyethylene (HDPE) and may be blow molded. Alternatively, the container 80 can be a collapsible container or a bladder-type container. The container 80 may have the volume capacity of one U.S. gallon and may include one or more handles 81 and may include a 38 mm neck 84. The container 80 may be opaque and have a particular color 82 such as a solid color as well as a scale line 83. The container 80 may be shaped to be flush with a front of the vehicle seat 120 and may rest on a floorboard of the vehicle 130 or a floor allowing the liquid body waste 140 to flow from the hose 70 into the container 80. The scale line 83 may allow a user to see a fill line and determine if the container 80 is to be emptied. The container 80 may have a 38 mm cap having a lanyard 85 to attach the cap to the container 80 and prevent loss. The container 80 can be disconnected from the hose 70 and the cap may be secured to the container 80 to prevent leakage and dripping. This allows a user to carry the container 80 and discreetly dispose of the liquid body waste 140.

The portable toilet system 100 may have a lid 90 that may be plastic and can be injection molded. The lid 90 may have one or more hinges 91 that may attach to the bowl 50. In addition, the lid 90 may have one or more finger tabs 92 that may be used to open and close the lid 90. The lid 90 may prevent odors from escaping from the bowl 50 when in a closed position and may allow use of the portable toilet system 100 when in an open position.

The anti-slip surface of the bottom base 10 may have one or more self-adhesive sheets that may be self-adhesive rubber sheets. The leveling system or device 20 may be located or incorporated in the side base 30 and the rod 22 may be in leveling rod slots 32 and connected with the pins 21 to the handles 24 on each side of the side base 30. The side base 30 may be attached to the bottom base 10 with an attachment device or by using an adhesive such as glue. The enclosure 40 may sit or rest on the bottom base 10 and/or the side base 30 and may be secured with the adhesive such as glue. The tube 60 can be secured to the drain receptacle or hole 52 using the adhesive such as glue. The bowl 50 may be located or placed into the enclosure 40 having the tube 60 and also may be secured using the adhesive such as glue. The lid 90 can be attached to the bowl 50 with hinges 53 or another attachment device. An upper connection of the hose 60 can connect to a bottom of the container 80 and a lower connection of the hose 60 can connect to a part of the container 80 such as a neck 84 of the container 80.

In another example, the portable toilet system 100 may have an angle greater than fifteen degrees. The portable toilet system 100 can drain below the floorboard 130 in other examples. In some cases, the portable toilet system 100 may have a flushing system and may have a container with flushing liquid. In some examples, the portable toilet system 100 may have a seat that can have hinges or the seat may be fixed to the bowl 50.

Figure 2B:
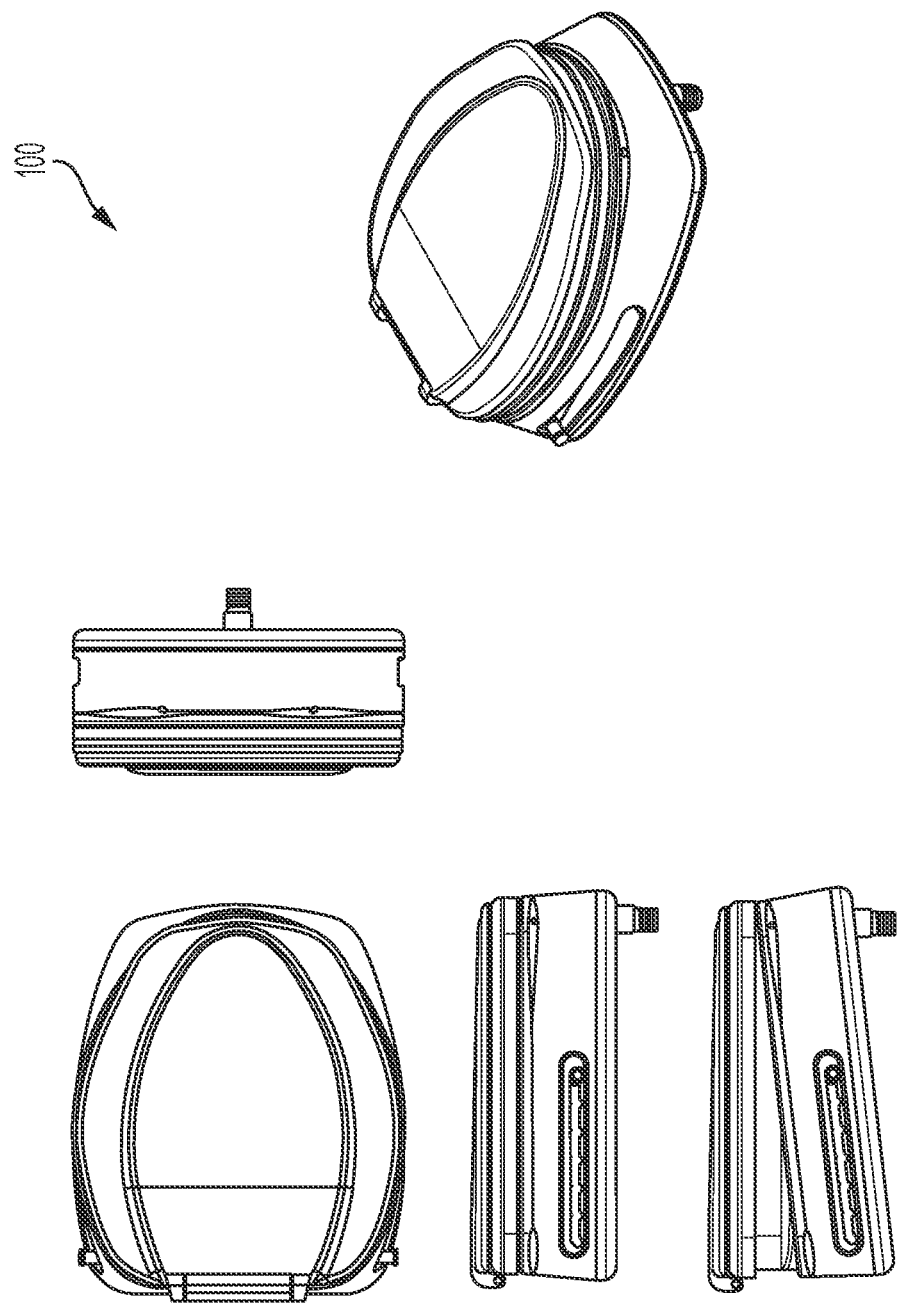
FIG. 2B shows another diagram of the portable toilet system according to an example of the instant disclosure.

FIG. 2A is a diagram of the bowl 50 of the portable toilet system 100 according to an example of the instant disclosure. FIG. 2B is another diagram of the portable toilet system 100 according to an example of the instant disclosure. As shown in FIG. 2A, the tube 60 has the ¾ inch GHT 62. The ¾ inch GHT hose cap 62 indicates where the tube 60 attaches to the bowl 50. As shown in FIG. 2B, the portable toilet system 100 may have one or more legs that may be associated with the leveling system 20 or device and they may be located on the bottom base 10. The one or more legs may rest on the vehicle seat 120.

Figure 3:
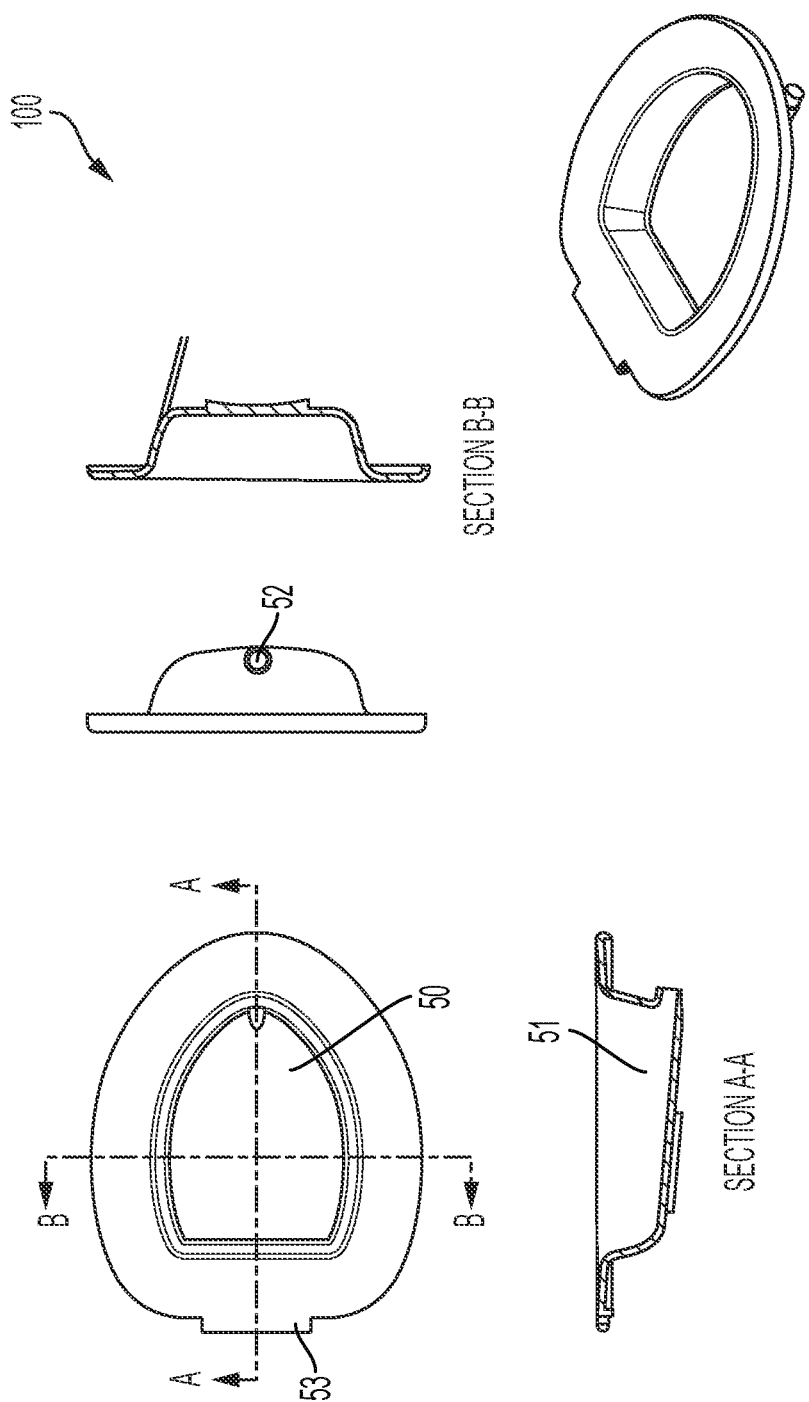
FIG. 3 is another diagram of the bowl of the portable toilet system according to an example of the instant disclosure.

FIG. 3 is another diagram of the bowl 50 of the portable toilet system 100 according to an example of the instant disclosure. As shown in FIG. 3, the bowl 50 may include the drain receptacle 52 and the bowl may be angled 51 to keep liquids within the bowl and to direct them to the drain hole 52. One or more hinges 53 may be provided on an end of the bowl 50.

Figure 4:
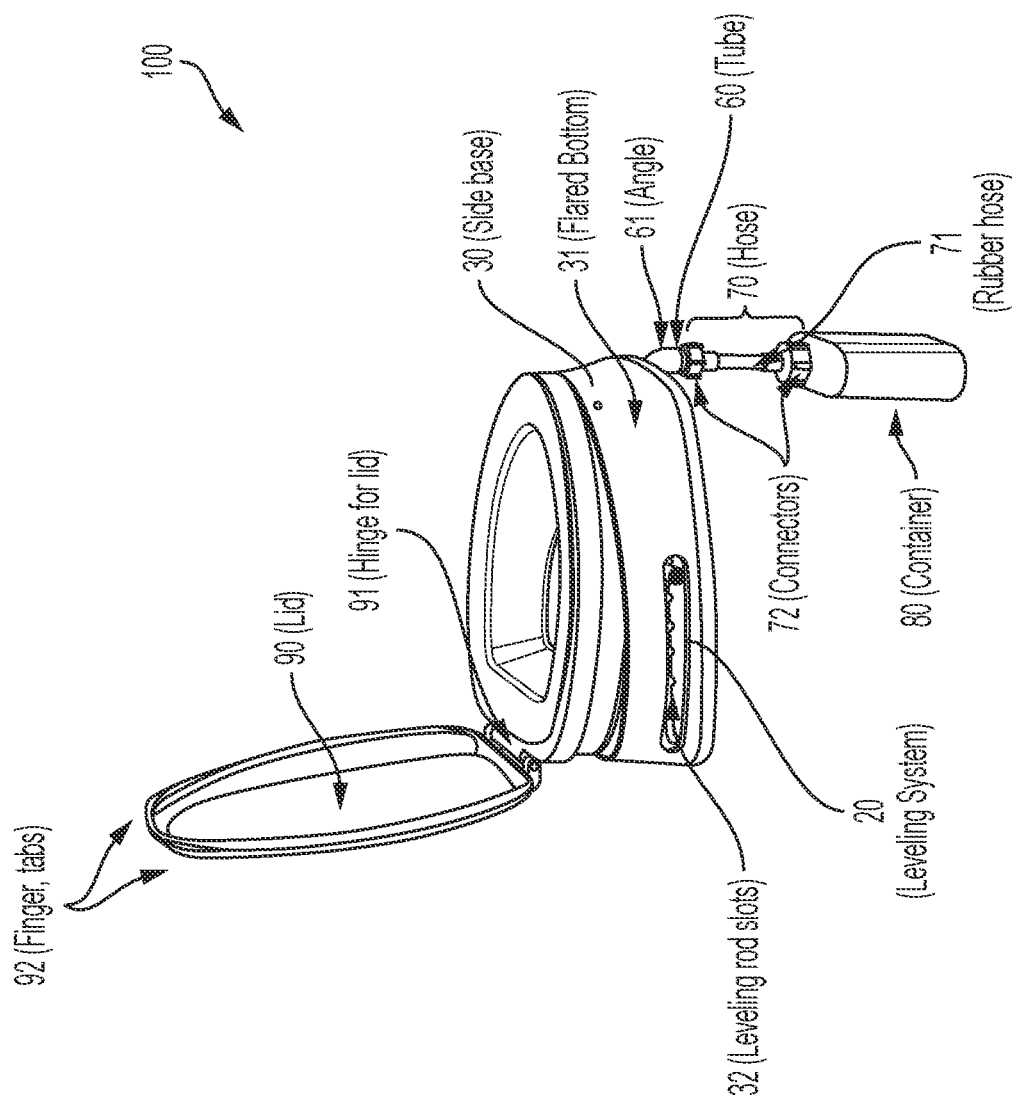
FIG. 4 is a side view of the portable toilet system according to an example of the instant disclosure.

FIG. 4 is a side view of the portable toilet system 100 according to an example of the instant disclosure. As shown in FIG. 4, the portable toilet system 100 may include a first portion 100 that may be placed or sat on the bottom of the seat of the vehicle 120 and a second portion associated with the container 80 that may be placed or sat on the floorboard of the vehicle 130.

The first portion may include the bottom base 10 and the side base 30 as well as the enclosure 40 and the bowl 50. The portable toilet system 100 is shown in an open position and thus the lid 90 is being held open.

Figure 5:
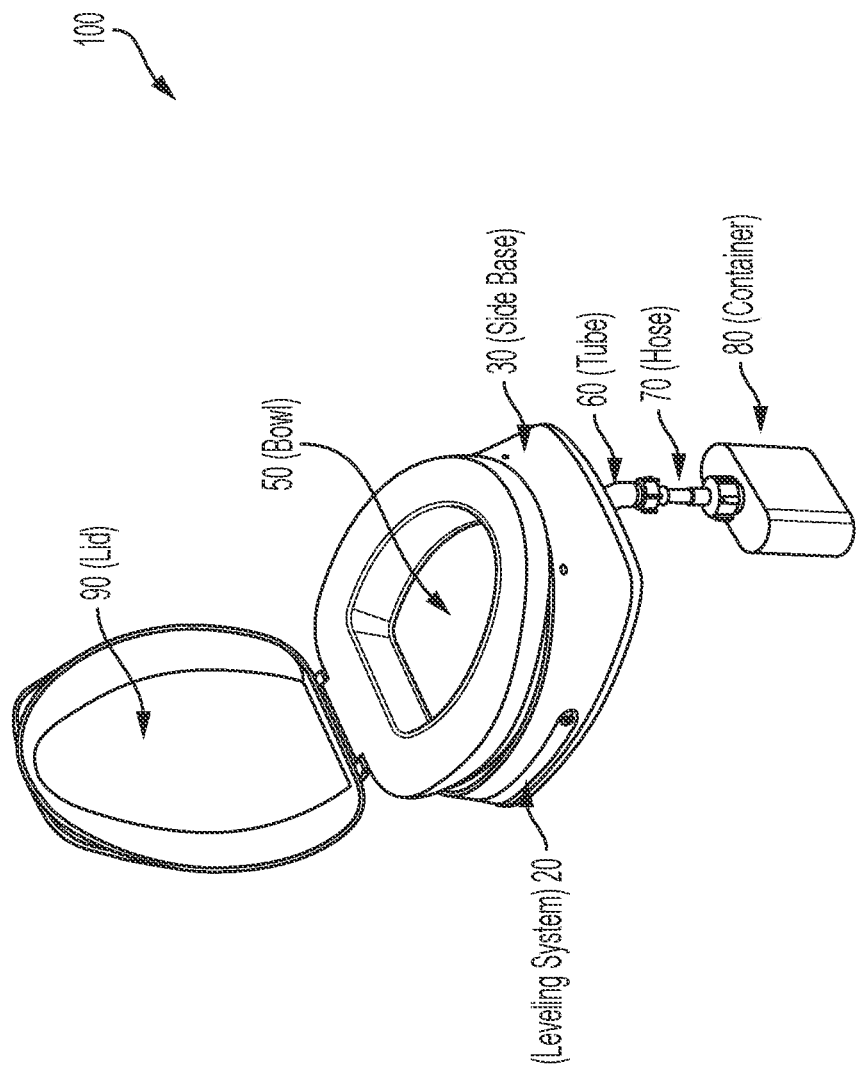
FIG. 5 is a top view of the portable toilet system according to an example of the instant disclosure.

FIG. 5 is a top or front view of the portable toilet system 100 according to an example of the instant disclosure.

Figure 6:
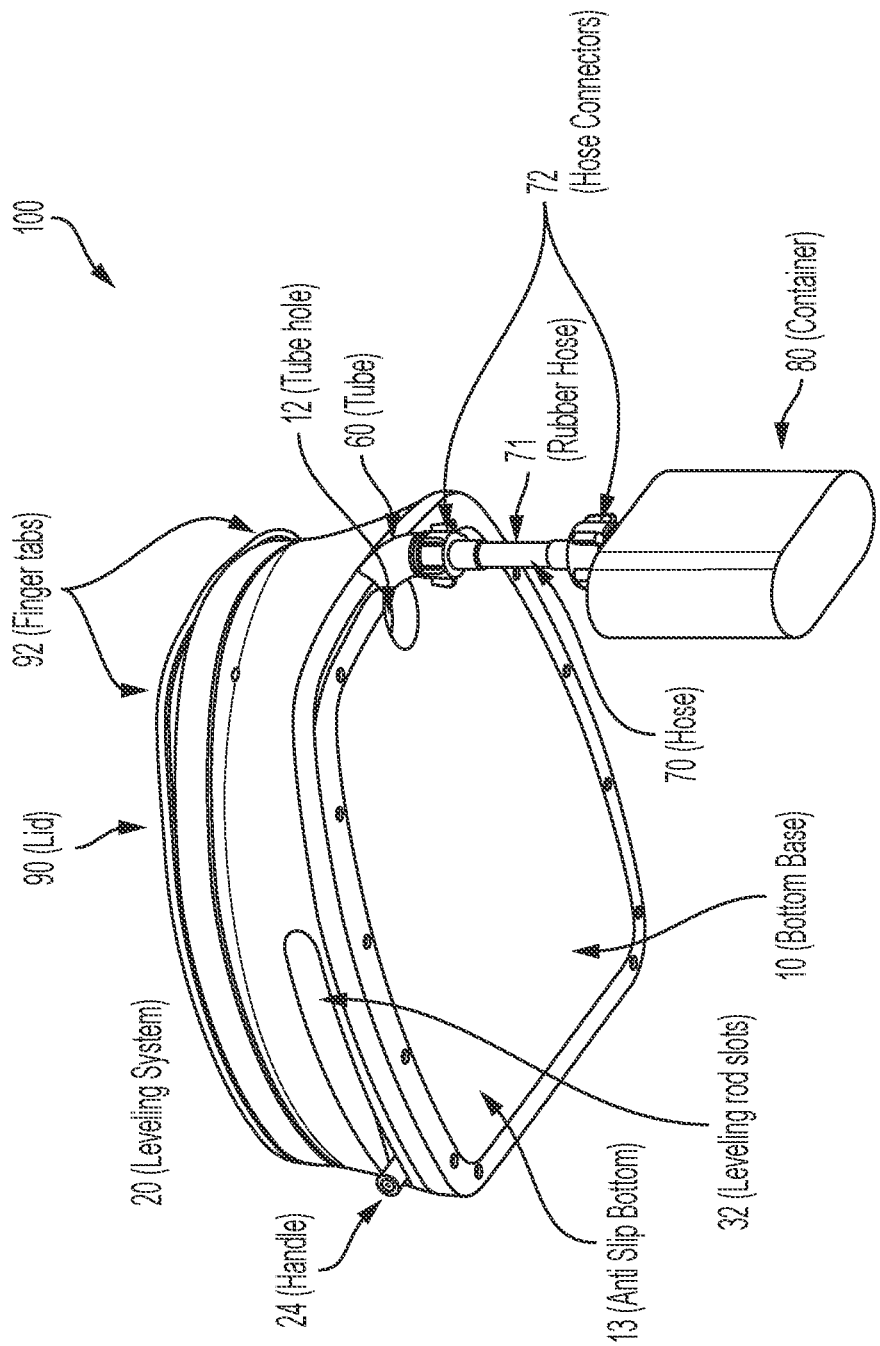
FIG. 6 is a bottom view of the portable toilet system according to an example of the instant disclosure.

FIG. 6 is a bottom view of the portable toilet system 100 according to an example of the instant disclosure.

Figure 7:
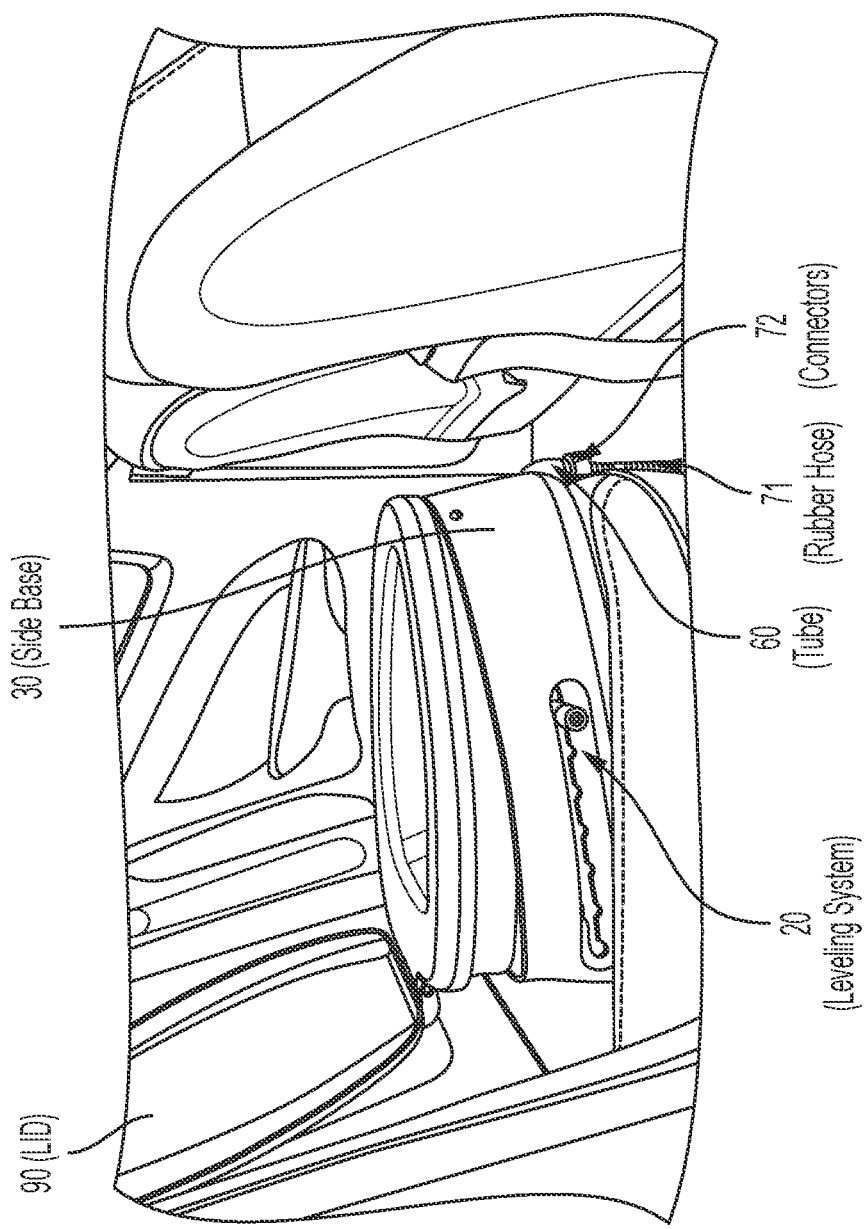
FIG. 7 is an upper perspective view of the portable toilet system according to an example of the instant disclosure.

FIG. 7 is an upper perspective view of the portable toilet system 100 according to an example of the instant disclosure.

Figure 8:
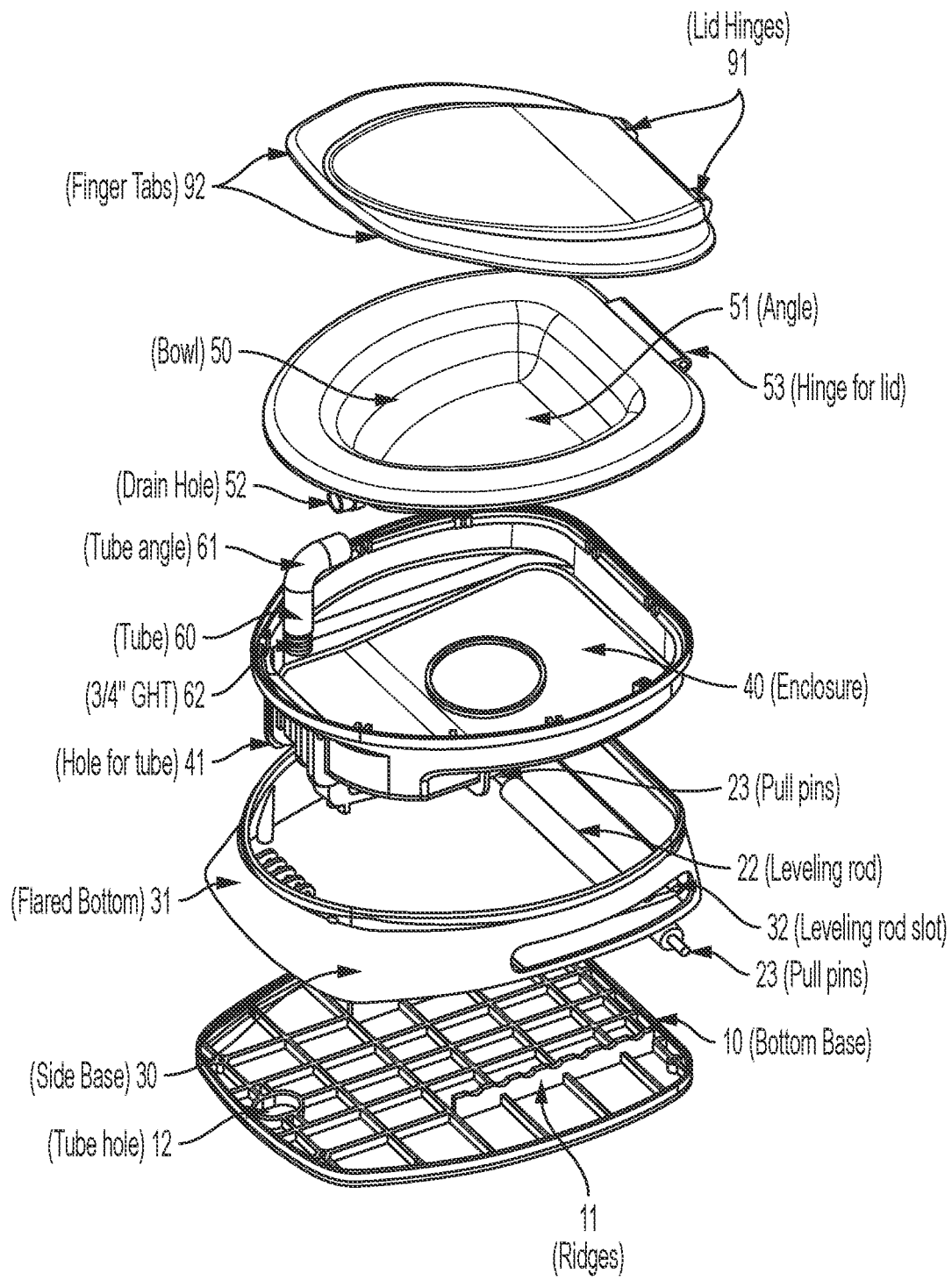
FIG. 8 is an exploded side view of the portable toilet system according to an example of the instant disclosure.

FIG. 8 is an exploded side view of the portable toilet system 100 according to an example of the instant disclosure.

Figure 9:
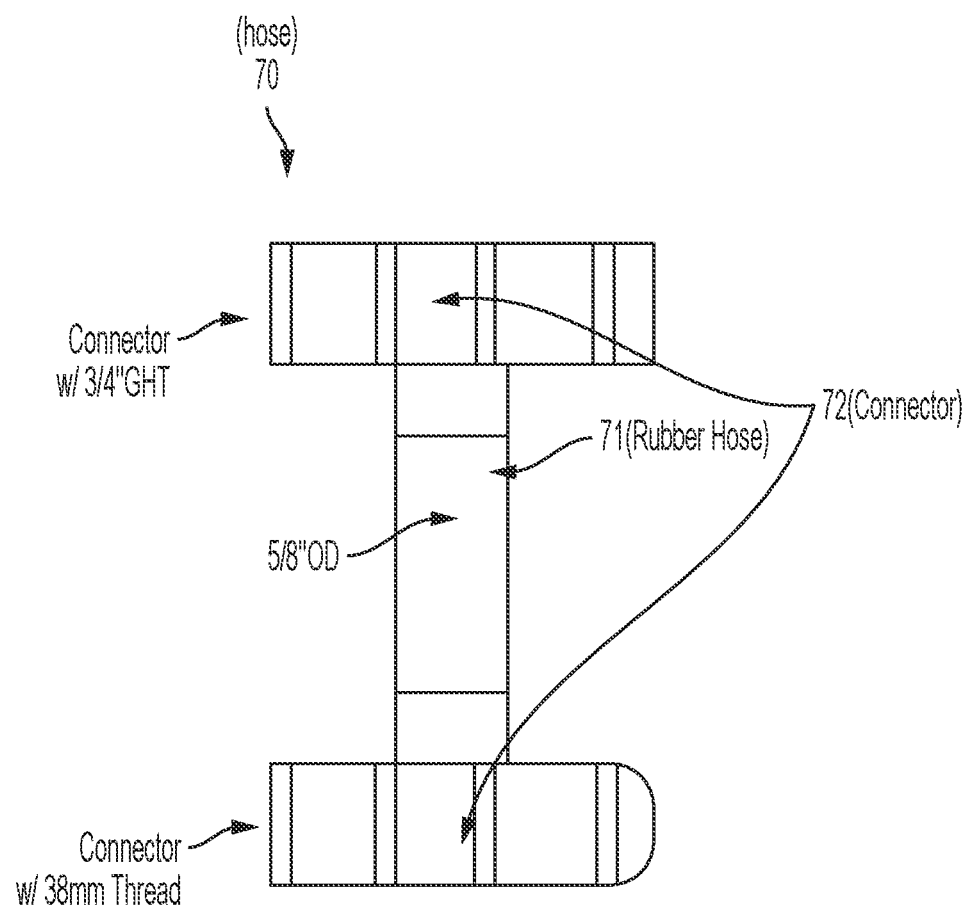
FIG. 9 is a diagram of a hose of the portable toilet system according to an example of the instant disclosure.

FIG. 9 is a diagram of the hose 70 of the portable toilet system 100 according to an example of the instant disclosure.

Figure 10A:
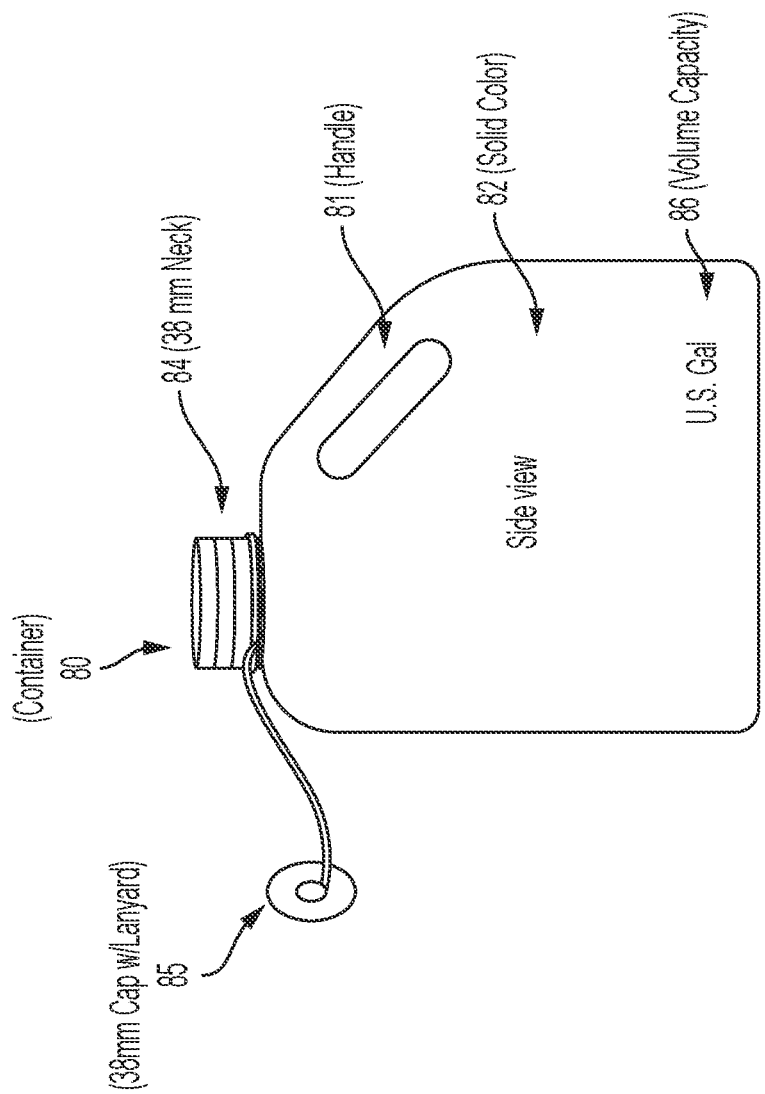
FIG. 10A is a diagram of a container of the portable toilet system according to an example of the instant disclosure.

FIG. 10A is a diagram of the container 80 of the portable toilet system 100 according to an example of the instant disclosure.

Figure 10B:
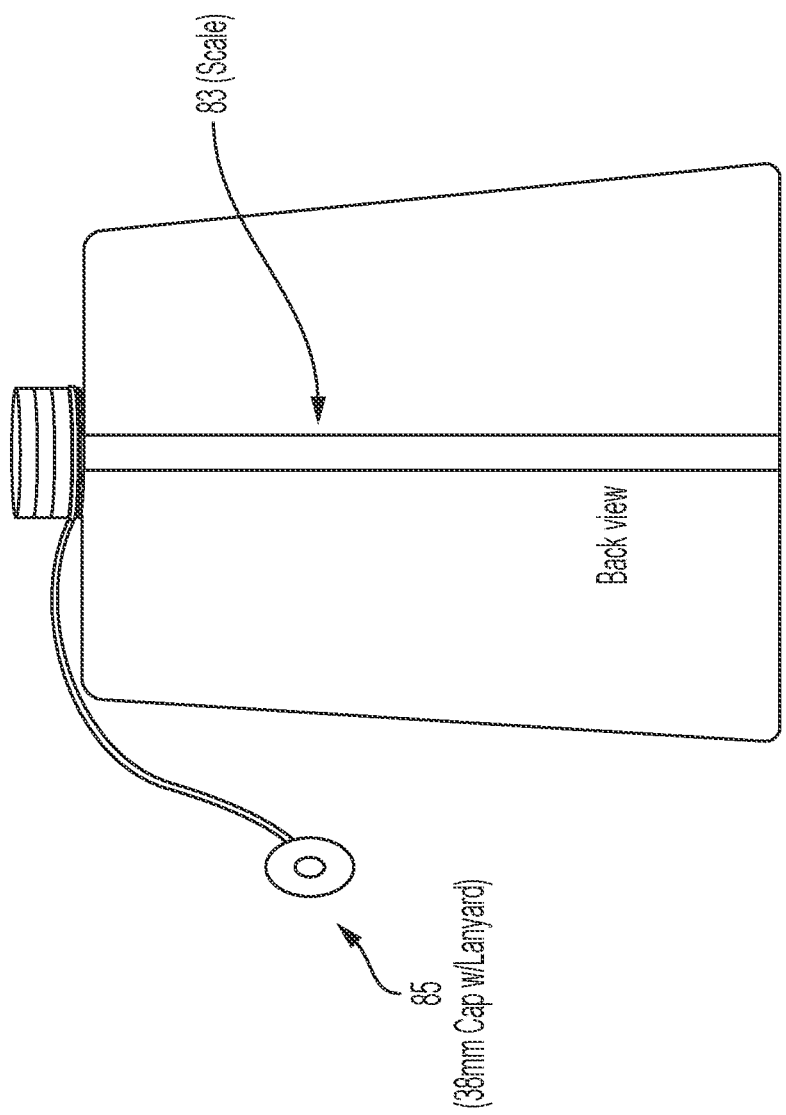
FIG. 10B is another diagram of a container of the portable toilet system according to an example of the instant disclosure.

FIG. 10B is another diagram of the container 80 of the portable toilet system according to an example of the instant disclosure.

Figure 10C:
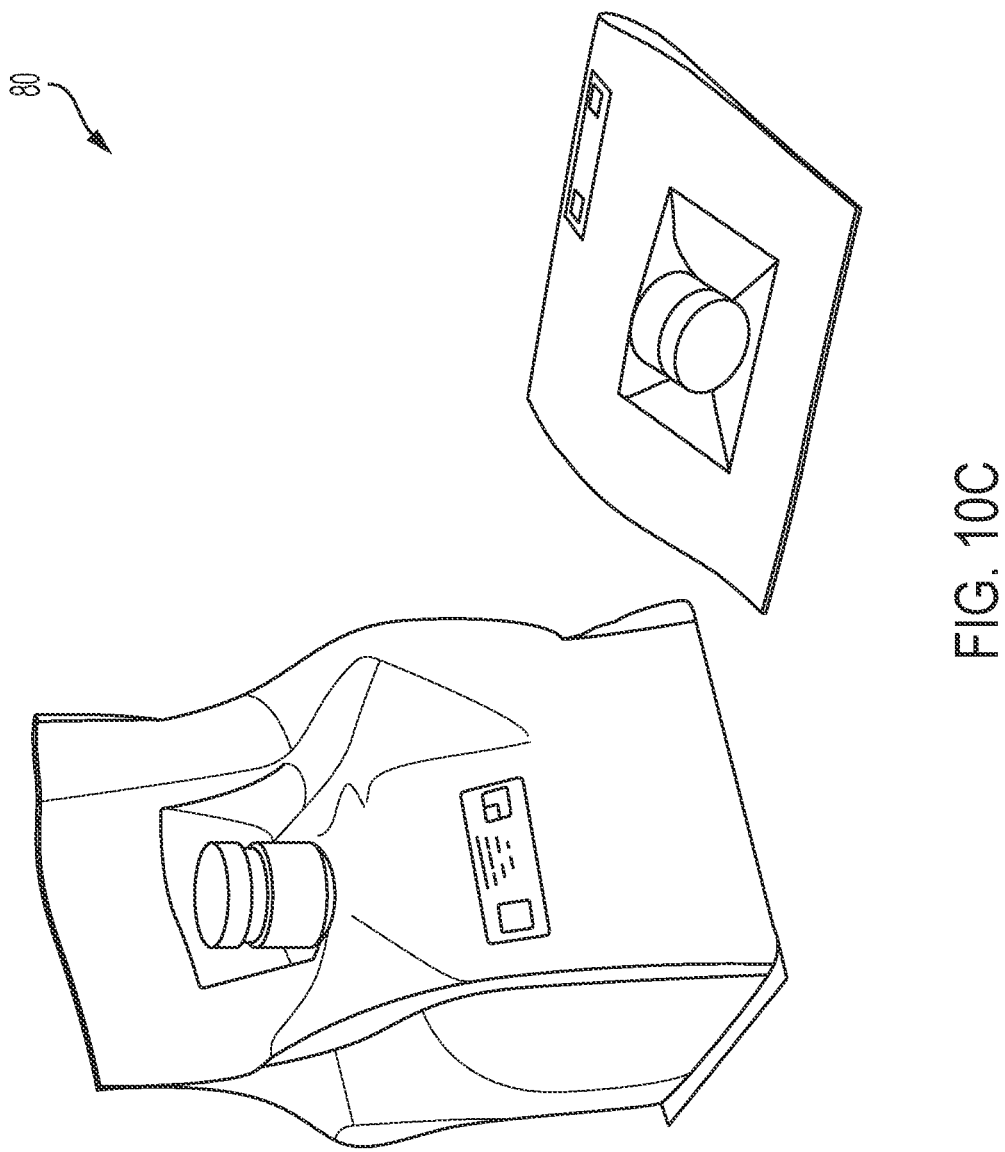
FIG. 10C is a photographic view of a collapsible container of the portable toilet system according to an example of the instant disclosure.

FIG. 10C is a photographic view of a collapsible container 80 of the portable toilet system 100 according to an example of the instant disclosure.

FIG. 11 is a diagram of a wedge block 1100 for leveling the portable toilet system 100 according to an example of the instant disclosure. As an example, the leveling system 20 may alternatively be a foam wedge block 1100 as shown in FIG. 11. The foam wedge block 1100 may be 9.3 inches long, 3.0 inches tall, and 6.0 inches in width. In addition, there may be a 2.5 inch top section that gradually transitions from the 3.0 inch height along the length portion of the block from one end to the other end and to the bottom as shown in FIG. 11. In one example, this wedge block 1100 may be used to level the portable toilet system 100 instead of and/or in addition to the leveling system or device 20.

Figure 12:
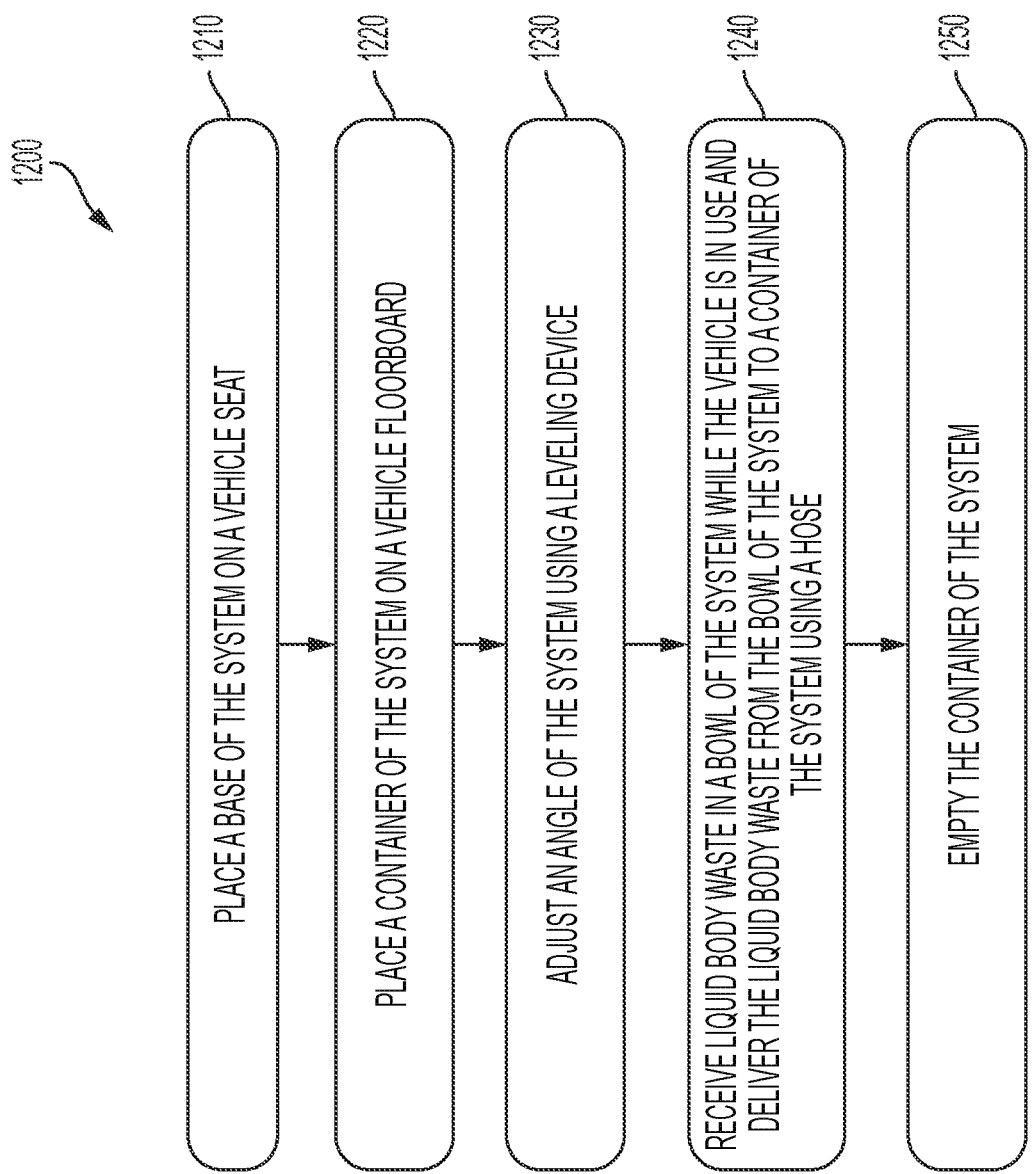
FIG. 12 shows an example method of using the portable toilet system according to an example of the instant disclosure.

FIG. 12 shows an example method of using the portable toilet system 100 according to an example of the instant disclosure. Although the example method 1200 depicts a particular sequence of operations, the sequence may be altered without departing from the scope of the present disclosure. For example, some of the operations depicted may be performed in parallel or in a different sequence that does not materially affect the function of the method 1200. In other examples, different components of an example device or system that implements the method 1200 may perform functions at substantially the same time or in a specific sequence.

According to some examples, the method 1200 may include placing a base, e.g., the bottom base 10 and/or the side base 30 of the portable toilet system 100 on the seat of the vehicle 120 at block 1210.

According to some examples, the method 1200 may include placing the container 80 of the portable toilet system 100 on the floorboard of the vehicle 130 at block 1220.

According to some examples, the method 1200 may include adjusting an angle of the portable toilet system 100 using the leveling system or device 20 at block 1230.

According to some examples, the method 1200 may include receiving liquid body waste 140 in the bowl 50 of the portable toilet system 100 and delivering the liquid body waste 140 from the bowl 50 of the portable toilet system 100 to the container 80 using the hose 70 at block 1240.

According to some examples, the method 1200 may include emptying the container 80 of the portable toilet system 100 at block 1250.

According to some examples, the method 1200 may include moving the at least one rod 22 within a leveling rod slot 32 in response to a user provided input to adjust the angle of the bowl 50 from zero to fifteen degrees.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

Illustrative examples of the disclosure include:

Aspect 1: A system comprising: a first portion comprising: a bowl to receive liquid body waste and a receptacle to receive a tube, a base having at least one anti-slip surface on a bottom of the base, a leveling device incorporated into the base and configured to allow the bowl to be angled at an angle of zero to fifteen degrees, the leveling device having at least one rod in a leveling rod slot of the base, each rod having a corresponding pin and a first handle on a right side of the bowl and a second handle on a left side of the bowl, and a second portion comprising: a hose that connects from the tube on a first end to a container on a second end to transport the liquid body waste from the bowl to the container, the container storing the liquid body waste.

Aspect 2: The system of Aspect 1, wherein the container comprises one of a one gallon opaque container and a collapsible one gallon bladder.

Aspect 3: The system of Aspects 1 and 2, wherein the container comprises a handle, a neck, a cap to open and close the container, and a lanyard attached to the cap.

Aspect 4: The system of Aspects 1 to 3, wherein the hose including at least one connector is six inches in length.

Aspect 5: The system of Aspects 1 to 4, wherein the hose connects with the tube using a garden hose thread (GHT).

Aspect 6: The system of Aspects 1 to 5, wherein the hose connects with the container using a GHT.

Aspect 7: The system of Aspects 1 to 6, wherein the first portion is seated on a seat of the vehicle and the second portion is seated on a floorboard of the vehicle.

Aspect 8: The system of Aspects 1 to 7, wherein the base comprises a bottom base and a side base, the bottom base is plastic and comprises ridges associated with the leveling device and a tube hole to receive the tube, and the side base is plastic and attaches to the bottom base and an enclosure for the bowl and comprises a flared bottom providing stability.

Aspect 9: The system of Aspects 1 to 8, wherein the container is portable and removable from the system.

Aspect 10: The system of Aspects 1 to 9, wherein the at least one anti-slip surface comprises a silicone rubber surface on a first side of the anti-slip surface and a self-adhesive on a second and opposite side of the anti-slip surface.

Aspect 11: A system comprising: a first portion comprising: a bowl to receive liquid body waste and a receptacle to receive a tube, a base having at least one anti-slip surface on a bottom of the base, a leveling device comprising a foam block and configured to allow the bowl to be angled at an angle of zero to fifteen degrees, and a second portion comprising: a hose that connects from the tube on a first end to a container on a second end to transport the liquid body waste from the bowl to the container, the container storing the liquid body waste.

Aspect 12: The system of Aspect 11, wherein the foam block is 9.3 inches long, 3.0 inches tall, and 6.0 inches wide, and comprises a 2.5 inch top section transitioning lengthwise from 3.0 inches tall from a top of the foam block at a first end of the foam block to zero inches at a bottom of the foam block at a second end of the foam block.

Aspect 13: The system of Aspects 11 and 12, wherein the base comprises a bottom base and a side base, the bottom base is plastic and comprises ridges associated with the leveling device and a tube hole to receive the tube, and the side base is plastic and attaches to the bottom base and an enclosure for the bowl and comprises a flared bottom providing stability.

Aspect 14: The system of Aspects 11 to 13, wherein the container is portable and removable from the system.

Aspect 15: A method comprising: placing a base of a portable toilet system on a seat of a vehicle, placing a container of the portable toilet system on a floorboard of the vehicle, adjusting an angle of a bowl of the portable toilet system using a leveling device incorporated into the base and configured to allow the bowl to be angled at the angle of zero to fifteen degrees, the leveling device having at least one rod, each rod having a corresponding pin and a first handle on a right side of the bowl and a second handle on a left side of the bowl, receiving liquid body waste in the bowl of the portable toilet system while in the vehicle and delivering the liquid body waste from the bowl of the portable toilet system to a container of the portable toilet system using a hose that is connected from the bowl of the portable toilet system to the container, and emptying the container of the portable toilet system.

Aspect 16: The method of Aspect 15, wherein the leveling device is incorporated into a side of the base of the portable toilet system.

Aspect 17: The method of Aspects 15 and 16, wherein the leveling device comprises a foam block that is 9.3 inches long. 3.0 inches tall, and 6.0 inches wide and comprises a 2.5 inch top section transitioning 3.0 inches tall from a top of the foam block at a first end of the foam block to zero inches at a bottom of the foam block at a second end of the foam block.

Aspect 18: The method of Aspects 15 to 17, further comprising moving the at least one rod within a rod slot in response to a user provided input to adjust the angle of the bowl from zero to fifteen degrees.

Aspect 19: The method of Aspects 15 to 18, wherein the container is portable and removable from the system and comprises one of a one gallon opaque container and a collapsible one gallon container.

Aspect 20: The method of Aspects 15 to 19, wherein the base comprises a bottom base and a side base, the bottom base is plastic and comprises ridges associated with the leveling device and a tube hole to receive the tube, and the side base is plastic and attaches to the bottom base and an enclosure for the bowl and comprises a flared bottom providing stability.

What is claimed is:

1. A system, comprising:
a first portion comprising:
a bowl to receive liquid body waste and a receptacle to receive a tube;
a base having at least one anti-slip surface on a bottom of the base;
a leveling device incorporated into the base and configured to allow the bowl to be angled at an angle of zero to fifteen degrees, the leveling device having at least one rod in a leveling rod slot of the base, each rod having a corresponding pin and a first handle on a right side of the bowl and a second handle on a left side of the bowl; and
a second portion comprising:
a hose that connects from the tube on a first end to a container on a second end to transport the liquid body waste from the bowl to the container, the container storing the liquid body waste.

2. The system of claim 1, wherein the container comprises one of a one gallon opaque container and a collapsible one gallon bladder.

3. The system of claim 2, wherein the container comprises a handle, a neck, a cap to open and close the container, and a lanyard attached to the cap.

4. The system of claim 1, wherein the hose including at least one connector is six inches in length.

5. The system of claim 1, wherein the hose connects with the tube using a garden hose thread (GHT).

6. The system of claim 1, wherein the hose connects with the container using a GHT.

7. The system of claim 1, wherein the first portion is seated on a seat of the vehicle and the second portion is seated on a floorboard of the vehicle.

8. The system of claim 1, wherein the base comprises a bottom base and a side base, the bottom base is plastic and comprises ridges associated with the leveling device and a tube hole to receive the tube, and the side base is plastic and attaches to the bottom base and an enclosure for the bowl and comprises a flared bottom providing stability.

9. The system of claim 1, wherein the container is portable and removable from the system.

10. The system of claim 1, wherein the at least one anti-slip surface comprises a silicone rubber surface on a first side of the anti-slip surface and a self-adhesive on a second and opposite side of the anti-slip surface.

11. A system, comprising:
a first portion comprising:
a bowl to receive liquid body waste and a receptacle to receive a tube;
a base having at least one anti-slip surface on a bottom of the base;
a leveling device comprising a foam block and configured to allow the bowl to be angled at an angle of zero to fifteen degrees; and
a second portion comprising:
a hose that connects from the tube on a first end to a container on a second end to transport the liquid body waste from the bowl to the container, the container storing the liquid body waste.

12. The system of claim 11, wherein the foam block is 9.3 inches long, 3.0 inches tall, and 6.0 inches wide, and comprises a 2.5 inch top section transitioning lengthwise from 3.0 inches tall from a top of the foam block at a first end of the foam block to zero inches at a bottom of the foam block at a second end of the foam block.

13. The system of claim 11, wherein the base comprises a bottom base and a side base, the bottom base is plastic and comprises ridges associated with the leveling device and a tube hole to receive the tube, and the side base is plastic and attaches to the bottom base and an enclosure for the bowl and comprises a flared bottom providing stability.

14. The system of claim 11, wherein the container is portable and removable from the system.

15. A method, comprising:
placing a base of a portable toilet system on a seat of a vehicle;
placing a container of the portable toilet system on a floorboard of the vehicle;
adjusting an angle of a bowl of the portable toilet system using a leveling device incorporated into the base and configured to allow the bowl to be angled at the angle of zero to fifteen degrees, the leveling device having at least one rod, each rod having a corresponding pin and a first handle on a right side of the bowl and a second handle on a left side of the bowl;
receiving liquid body waste in the bowl of the portable toilet system while in the vehicle and delivering the liquid body waste from the bowl of the portable toilet system to a container of the portable toilet system using a hose that is connected from the bowl of the portable toilet system to the container; and
emptying the container of the portable toilet system.

16. The method of claim 15, wherein the leveling device is incorporated into a side of the base of the portable toilet system.

17. The method of claim 15, wherein the leveling device comprises a foam block that is 9.3 inches long, 3.0 inches tall, and 6.0 inches wide and comprises a 2.5 inch top section transitioning 3.0 inches tall from a top of the foam block at a first end of the foam block to zero inches at a bottom of the foam block at a second end of the foam block.

18. The method of claim 15, further comprising moving the at least one rod within a rod slot in response to a user provided input to adjust the angle of the bowl from zero to fifteen degrees.

19. The method of claim 15, wherein the container is portable and removable from the system and comprises one of a one gallon opaque container and a collapsible one gallon container.

20. The method of claim 15, wherein the base comprises a bottom base and a side base, the bottom base is plastic and comprises ridges associated with the leveling device and a tube hole to receive the tube, and the side base is plastic and attaches to the bottom base and an enclosure for the bowl and comprises a flared bottom providing stability.

* * * * *